Patented Oct. 12, 1937

2,095,944

UNITED STATES PATENT OFFICE 2,095,944

LAMINATED GLASS AND PROCESS FOR PREPARING

Walter Bauer and Adolf Gerlach, Darmstadt, Germany, assignors to Röhm & Haas Company, Philadelphia, Pa.

No Drawing. Application October 19, 1932, Serial No. 638,521. In Germany September 21, 1927

38 Claims. (Cl. 49—81)

This application relates to a process for manufacturing non-splintering glass or similar objects by the use of certain unsaturated polymerizable organic compounds, notably the esters of acrylic and alpha substituted acrylic acids and homologues and is a continuation in part of Serial No. 270,794 filed April 17, 1928.

The expression "glass" as referred to herein is to be taken in its broadest sense, i. e., inorganic and organic glasses or glass-like films; also such materials, as enamels, porcelain, and the like which are obtained by melting or sintering glassy compositions.

Whenever esters of acrylic and alpha substituted acrylic acids and homologues are referred to herein it is understood that there are included all compounds which are derived from these acids and which alone, or with additional softeners or plasticizers, make possible, in polymerizable or polymerized condition, the formation of a film.

"Non-splinterable glass" as referred to herein, is understood to be a composite product consisting of a piece or plate of glass with a layer of polymeric ester on one or both sides or of two glasses with an intermediate layer of polymeric acid ester; all such being combinations of glass and polymeric ester either alone or in combination with other materials, such as metal, etc., such composite product being resistant to shock or impact and from which substantially no splinters will separate when the product is subjected to a blow or other impact. Additional layers of other transparent materials or adhesives as well as a plurality of layers of glass and polymeric esters come within the scope of this definition.

The general process of preparing such non-splinterable glass consists in placing a film of substantial thickness containing polymeric ester of the type described upon or between glass, polymerization of the ester being effected before, during, or after the placing upon the glass by methods already known, such as by irradiation or illumination with light, by heating, by subjecting to pressure or by treating with catalysts, for instance with benzoyl peroxide, such operations being used separately or in conjunction with each other. We prefer effecting the polymerization before applying the compound to the glass. The polymerized product may be applied in the form of a solution or film. This intermediate layer comprises a substantially completely polymerized acrylic or alpha substituted acrylic acid ester.

The ester may also be used in solution, the solvent being evaporated off as far as is necessary during the processing.

Instead of uniting the film of polymerized acrylic or alpha substituted acrylic acid derivative with the glass surface direct, we may also interpose an agglutinant such as gelatine between the glass and the film.

The use of films of polymerized acrylic or alpha substituted acrylic acid ester is especially suitable for preparing non-splinterable glass. The film of polymerized ester may be prepared directly upon the glass or it may be prepared separately. During the process of uniting the film with glass suitable liquids and more especially softening agents or plasticizers may be placed upon the film or the glass or both.

Instead of expressly adding a softening agent, we may also utilize the softening capacity of the solvents themselves, taking care that after drying the film some of the solvent remains over in the finished article.

It has further been found that also polymerized products which are liquid or semi-solid at ordinary temperature, such as the vinyl ethers and the higher alkyl esters of acrylic acid, including the propyl, butyl and amyl esters, may serve as softening agents.

The use of elevated pressures and/or temperatures is desirable for uniting the glass and the film of polymerized acrylic and/or methacrylic acid ester, more especially if large sheets are to be fabricated. High temperatures may be employed and pressures up to 20 atmospheres can be used. Particularly good results are obtained if the temperature does not exceed 85° centigrade and if a pressure of 2–7 atmospheres is used. Sometimes it is advisable to make the special glass, or similar material, while excluding the air, which can be accomplished in making the glass, or the like, in a liquid.

For obtaining special effects, colouring materials, dyes, pigments, natural or artificial resins or opacifiers may be used.

Films of the acrylates of the higher alcohols (butyl, amyl, etc.) are suitable for use but some of them are rather soft at ordinary temperatures and need to be mixed with substances to stiffen them.

The advantages of non-splinterable glass made by the above process are several, namely:—

1. The glass may be cut in the manner similar to that of cutting glass.

2. The glass is clear, transparent, and water white, the transparency and clearness persisting for long periods of time under all conditions of light.

3. It is resistant towards weathering conditions and is elastic.

4. It is adapted also for curved, spherical and hollow glass shapes.

5. The breaking strength of the glass changes only slightly with changes of temperature.

In order to explain more definitely the processing of non-splinterable glass by the present process, the following examples are given, it being understood that wide variations therefrom are possible without deviating from the spirit of the invention, and that different temperatures, pressures, solvents and plasticizers may be used if desired.

Example 1

A plate of polymeric acrylic acid ethyl ester having a thickness of four tenths millimeters is placed between two glass sheets and subjected for a short time to increased pressure in a press heated at 90° C.

Example 2

A 20% solution of poly alpha methacrylic acid methyl ester in chlorobenzene which contains 25% of a mixture of equal parts dibutyl phthalate and diethyl phthalate calculated on dry substance, this mixture serving as softener, is poured upon two glass plates of equal size, so that a film of 0.25 millimeter thickness is formed on each plate. After evaporating off the solvent, a thin layer of di-isobutyl phthalate is placed upon the film. The two glass plates are now superimposed with the film sides contacting. The excess of phthalic ester partially flows out. The greater part of the excess still remaining on the glass is then pressed out, for instance in a hydraulic press, at a temperature of about 70° C. and a pressure of about 5 atmospheres applied for about 10 minutes.

Example 3

Two hollow glasses are placed one inside the other so that the distance between the walls facing each other is about 0.5 millimeter. In the intermediate space a mixture of 60 parts monomeric-α-methacrylic acid ethyl ester, 20 parts phthalic acid-methyl glycol ester and 20 parts butyl phthalate is placed. The upper rim is made tight to prevent evaporation of the ester. The whole combination is exposed to light until polymerization had come to an end.

Example 4

A 25% solution of poly-n-propyl alpha-methacrylate in ethylene dichloride to which an amount of n-butyl tartrate equal to 15% of the non-volatile component has been added is poured upon two glass plates of equal size so that a film of 0.25 millimeter thickness is formed on each plate. The rest of the procedure is the same as Example 2.

Example 5

A 20% solution of polymerized isoamyl alpha-methacrylate in ethyl acetate is used in place of the film in Example 2 without the use of a plasticizer.

Example 6

A film of 0.6 m. m. thickness is cut from a block prepared by polymerizing a mixture of 80 parts n-butyl alpha-methacrylate, 10 parts dibutyl phthalate and 10 parts di-ethylene glycol monoethyl ether. This film is placed between two glass plates, whose surfaces have been sprayed lightly with methyl glycol phthalate, and pressed for 10 min. in a suitable press at 80° C. and 30 lbs. pressure per square inch.

Example 7

Same as Example 3 except that hollow space is filled with the methyl cellosolve ester of alpha-methacrylic acid mixed with .05% benzoyl peroxide and the whole subjected to polymerizing influences such as light.

Example 8

A 20% solution of polymerized methyl acrylate in benzene is employed, in the same manner as the polymer described in Example 2.

Example 9

A 22% solution of polymerized ethyl acrylate in a solvent mixture consisting of 80 parts ethylene dichloride and 20 parts ethyl alcohol is used in preparing the glass as described in Example 2.

Example 10

A 20% solution of polymeric isopropyl acrylate in chloroform is used in a manner similar to that described in Example 2 for making the laminated glass.

Example 11

A product is made as described in Example 3 except that the space is filled with butyl acrylate containing 0.04% benzoyl peroxide and polymerization carried out with low heat (about 50° C.) and light.

Instead of polymerizing entirely beforehand or after the polymer is applied to the glass plates it is possible in some cases to partially polymerize beforehand and complete the polymerization in situ.

What we claim is:

1. Laminated glass comprising a plurality of sheets of glass and an interposed layer comprising at least one of the group consisting of polymerized esters of acrylic and alpha methacrylic acids firmly uniting said glass sheets.

2. Laminated glass composed of a plurality of sheets of glass and an interposed layer consisting of at least one of the group consisting of the elastic products of polymerization of aliphatic esters of acrylic and alpha methacrylic acids and a plasticizer firmly uniting said glass sheets.

3. Safety glass suitable for use as windshields for automobiles consisting of a plurality of sheets of glass and an interposed layer of at least .25 mm. thickness, said interposed layer composed of one of the group consisting of elastic polymerized aliphatic esters of acrylic and alpha methacrylic acids and a plasticizer firmly uniting said glass sheets.

4. Non-splinterable glass consisting of a plurality of sheets of glass and an interposed layer composed of a polymerized ester of one of the group consisting of acrylic and methacrylic acids firmly uniting said glass sheets.

5. Non-splinterable glass comprising a plurality of sheets of glass and an interposed layer comprising a polymerized ester of alpha methacrylic acid firmly uniting said glass sheets.

6. Non-splinterable glass comprising a plurality of sheets of glass and an interposed layer composed of a polymerized aliphatic ester of one of the group consisting of acrylic and alpha methacrylic acids and a plasticizer firmly uniting said glass sheets.

7. Non-splinterable glass composed of a plurality of sheets of glass and a polymerized aliphatic ester of acrylic acid and a plasticizer firmly uniting said glass sheets.

8. Non-splinterable glass comprising a plurality of sheets of glass and a polymerized aliphatic ester of alpha methacrylic acid firmly uniting said glass sheets.

9. Non-splinterable glass comprising a plurality of sheets of glass and the polymerized methyl ester of alpha methacrylic acid firmly uniting said glass sheets.

10. A method for preparing non-splinterable glass which consists in polymerizing a polymerizable ester of one of the group of acrylic and alpha methacrylic acids and applying it to one side of at least one of two glass plates, the two steps taking place in any desired order, and then assembling the glass plates and applying heat and pressure to form a laminated glass with the polymerized ester firmly uniting the glass plates.

11. A method for preparing non-splinterable glass which comprises partially polymerizing a polymerizable ester of the group consisting of the acrylic and methacrylic acid esters, interposing the partial polymer between glass plates, and completing the polymerization to form a laminated glass having the polymerized ester firmly uniting the glass sheets.

12. A method for preparing non-splinterable glass which comprises partially polymerizing a polymerizable ester of the group consisting of the acrylic and methacrylic acid esters, interposing the partial polymer between glass plates, and completing the polymerization under heat and pressure to form a laminated glass having the polymerized ester firmly uniting the glass sheets.

13. A method for preparing non-splinterable glass which comprises polymerizing an ester of alpha methacrylic acid and applying it to glass plates, the two steps taking place in any desired order, then uniting the glass plates.

14. A method for preparing non-splinterable glass which comprises polymerizing an ester of alpha methacrylic acid and applying it to glass plates, the two steps taking place in any desired order, then applying heat and pressure to unite the glass plates.

15. Non-splinterable glass comprising a plurality of sheets of glass and a product composed of the polymerized ethyl ester of acrylic acid and a plasticizer firmly uniting said glass sheets.

16. Non-splinterable glass comprising a plurality of sheets of glass and a polymerized product comprising ethyl ester of alpha methacrylic acid firmly uniting said glass sheets.

17. The process of making compound glass which comprises coating at least one of two sheets of glass with a solution of elastic polymerized ester of one of the group consisting of acrylic and alpha methacrylic acids, removing at least part of the solvent, and joining the glass sheets to form a compound glass with the polymerized ester firmly uniting said glass sheets.

18. The process of claim 17 in which the solution contains a softener for the polymerized ester.

19. A method for preparing non-splinterable glass which comprises polymerizing a polymerizable ester of one of the group of acrylic and alpha methacrylic acids, and applying this product to one side of at least one of two glass sheets, the two steps taking place in any desired order, then consolidating the glass sheets to form a laminated glass with the polymerized ester firmly uniting the glass sheets.

20. Laminated glass comprising a sheet of glass carrying a coating comprising at least one polymerized ester of the group consisting of esters of acrylic and alpha substituted acrylic acids.

21. Laminated glass comprising a plurality of sheets of glass and an interposed layer comprising at least one polymerized ester of the group consisting of acrylic and alpha methacrylic acids.

22. Laminated glass comprising a plurality of sheets of glass and an interposed layer comprising at least one polymerized ester of the group consisting of esters of acrylic and alpha methacrylic acids, said interposed layer being cemented to the glass by means of an adhesive.

23. Process as described in claim 10, in which the plates are pressed together at a temperature not substantially higher than 85° C. and at a pressure not substantially higher than 7 atmospheres.

24. Process as described in claim 10, in which the plates are pressed together with the exclusion of air.

25. Laminated glass comprising a plurality of sheets of glass and an interposed layer comprising a higher ester of one of the group consisting of polymerized esters of acrylic and methacrylic acids, and a hardening agent.

26. Non-splinterable glass comprising a plurality of sheets of glass having interposed therebetween one or more layers of non-brittle reinforcing materials, the material in contact with the glass sheets comprising a polymerized ester of the group consisting of acrylic and $\alpha$-methacrylic acid.

27. Non-splinterable glass comprising a plurality of sheets of glass having interposed therebetween one or more layers of a non-brittle reinforcing material that comprises a polymer of the group consisting of the elastic products of polymerization of acrylic and $\alpha$-methacrylic acid esters.

28. Non-splinterable glass comprising a plurality of sheets of glass having interposed therebetween one or more layers of a non-brittle reinforcing material that comprises a polymer of the group consisting of the elastic products of polymerization of acrylic and $\alpha$-methacrylic acid esters that contain from one to five, inclusive, carbon atoms in the alcohol radical.

29. Non-splinterable glass comprising a sheet of glass carrying a coating comprising a polymer of the group consisting of the elastic products of polymerization of acrylic and $\alpha$-methacrylic acid esters that contain from one to five, inclusive, carbon atoms in the alcohol radical.

30. Non-splinterable glass comprising a plurality of sheets of glass having interposed therebetween one or more layers of a non-brittle reinforcing material that comprises the polymerized ethyl ester of acrylic acid.

31. Non-splinterable glass comprising a plurality of sheets of glass having interposed therebetween one or more layers of a non-brittle reinforcing material that comprises the polymerized ethyl ester of $\alpha$-methacrylic acid.

32. Non-splinterable glass comprising a plurality of sheets of glass and a polymerized aliphatic ester of $\alpha$-methacrylic acid containing at least 20% of plasticizing material firmly uniting said glass sheets.

33. Non-splinterable glass comprising a plurality of sheets of glass and the polymerized methyl ester of $\alpha$-methacrylic acid containing at least 20% of plasticizing materials firmly uniting said glass sheets.

34. Non-splinterable glass comprising a plurality of sheets of glass having interposed therebetween one or more layers of a non-brittle reinforcing material that comprises a polymer of the group consisting of the elastic products of polymerization of acrylic and α-substituted acrylic acid esters.

35. Non-splinterable glass comprising a plurality of sheets of glass having interposed therebetween one or more layers of a non-brittle reinforcing material that comprises a polymer of the group consisting of the elastic products of polymerization of aliphatic esters of acrylic and α-substituted acrylic acids.

36. Non-splinterable glass consisting of a plurality of sheets of glass having interposed therebetween one or more layers of a polymer of the group consisting of the elastic products of polymerization of acrylic and α-substituted acrylic acid esters.

37. Non-splinterable glass consisting of a plurality of sheets of glass having interposed therebetween one or more layers of a polymer of the group consisting of the elastic products of polymerization of aliphatic esters of acrylic and α-substituted acrylic acid.

38. Non-splinterable glass consisting of a plurality of sheets of glass having interposed therebetween one or more layers of a polymer of the group consisting of the elastic products of polymerization of acrylic and α-methacrylic acid esters that contain from one to five, inclusive, carbon atoms in the alcohol radical.

WALTER BAUER.
ADOLF GERLACH.